United States Patent

[11] 3,629,920

| [72] | Inventor | Herbert Loos |
| | | Munich, Germany |
| [21] | Appl. No. | 41,670 |
| [22] | Filed | May 22, 1970 |
| [45] | Patented | Dec. 28, 1971 |
| [73] | Assignee | Carl Hurth Maschinen-und Zahnradfabrik |
| | | Munich, Germany |
| [32] | Priority | June 12, 1967 |
| [33] | | Germany |
| [31] | | H 62978 |
| | | Continuation of application Ser. No. 735,618, June 10, 1968, now abandoned. This application May 22, 1970, Ser. No. 41,670 |

[54] GEAR CUTTER
10 Claims, 7 Drawing Figs.

[52] U.S. Cl. ................................................. 29/103
[51] Int. Cl. ..................................................... B26d 1/00
[50] Field of Search ........................................... 29/103, 103 B, 105, 105 A; 90/1.6, 1.65

[56] References Cited
UNITED STATES PATENTS

| 2,119,298 | 5/1938 | Simowski | 29/103 |
| 2,354,144 | 7/1944 | Ross | 29/105 X |
| 2,758,363 | 8/1956 | Praeg | 29/105 |

*Primary Examiner*—Harrison L. Hinson
*Attorney*—Woodhams, Blanchard and Flynn

ABSTRACT: A tool for the precision working of gears by chip removal therefrom such as in gear shaving and of the type wherein the flanks of the tool teeth comprise a plurality of alternate grooves and lands having a novel cutting edge construction between the surfaces of said lands and the walls of the adjacent grooves and between the tip surfaces of the tool teeth and the land adjacent thereto. Particularly said walls and the tip surfaces adjacent thereto are provided with cutting edges for plunge shaving wherein with a given relief angle the rake angle may be positive, negative or zero.

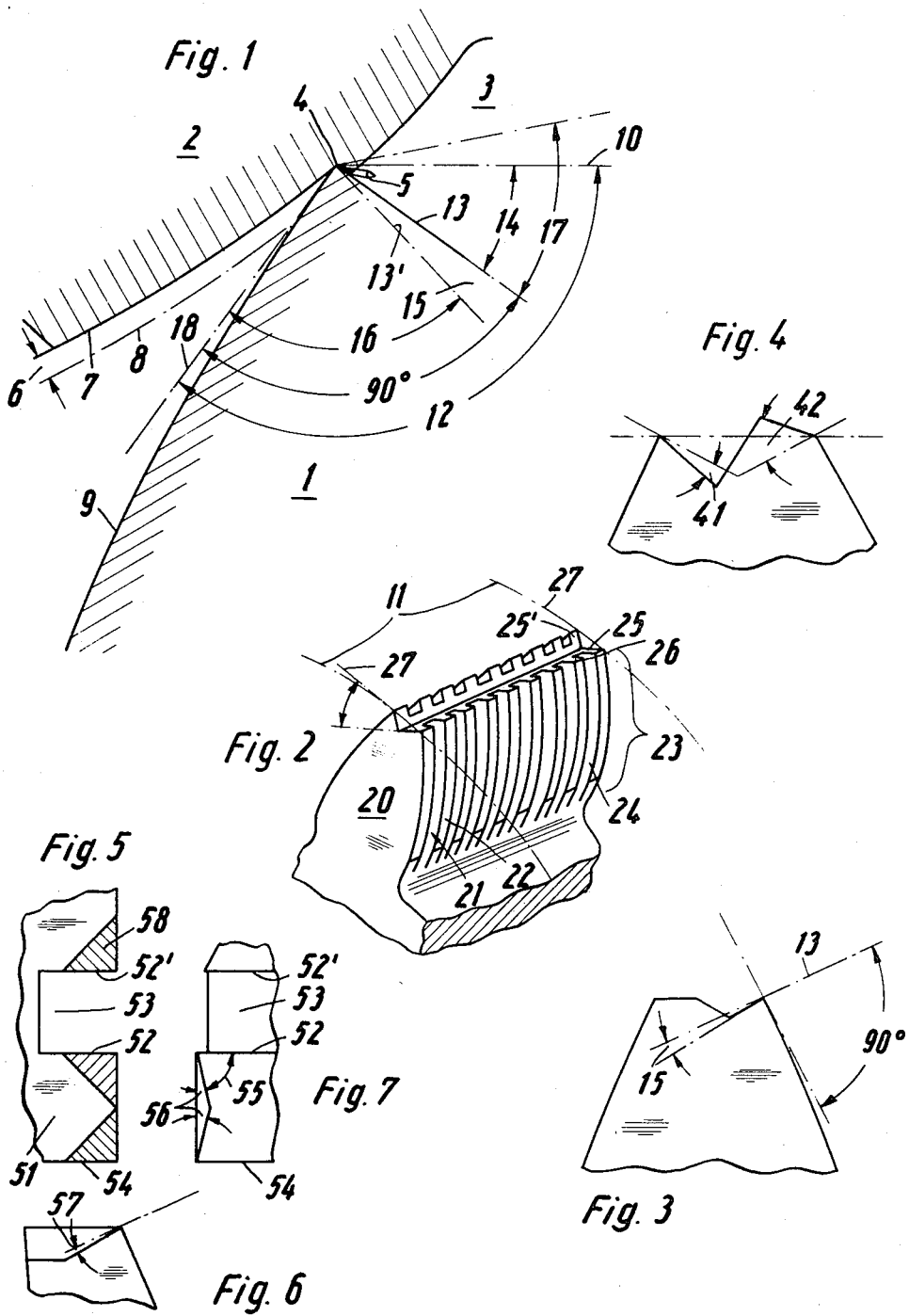

GEAR CUTTER

This application is a continuation of Ser. No. 735,618, filed June 10, 1968, now abandoned.

The invention relates to a gear-cutting tool for precision working of gears and removing chips therefrom, for example, a gear shaver whose tooth flanks are provided with a number of cutting edges formed by alternate grooves and lands. Tools of the type in question are so related to the work wheel that the axes of the workpiece and tool are arranged in crossing relationship. Through this crossing of axes there is provided a lengthwise movement which effects the chip removal. There are also known methods of working in which this crossing of axes is not utilized. In such cases the tools are provided with cutting grooves which are arranged at an angle to a plane normal to the axis. Such tools on the basis of the sliding motion along the involute (U.S. Pat. No. 2,126,178).

Many proposals have already been made for improving the cutting operation of shaving cutters. For example, shaving cutters are known whose grooves are arranged to follow a helical line along successive teeth. In such case, a controlled chip removal is assured especially in plunge shaving. However, the cutting angle itself will not be controlled thereby. (DAS 1 152 595).

It is already known in connection with shaving cutters which are provided with groove walls and tooth flanks to diminish the lip angle at the tooth flank in order to increase the relief angle at the tooth flank (DP 656 423, FIGS. 27, 28) or in order to provide (FIG. 26) a positive rake angle at the tooth flank. This proposal has not been commercially developed, probably for practical reasons, so that no actual experience with respect thereto is available.

It is, however, known to provide a negative rake angle at the tooth flank through appropriate sloping of the groove wall and this in several cases has brought good results (DBP 903 886).

All of the above-described measures relate to cutting edges which are provided by groove walls and tooth flanks. These cutting edges are indeed very important for chip removal and chip yield, however not the sole determining feature as has been determined by this invention. Shaving cutters are already known having cutting grooves which extend from the left flank to the right flank and whose walls are corresponding planes normal to the cutter axis. In such case there exists between the top surface of the tooth (outside cylinder) and the said groove walls an angle which is greater or less than 90°. There is a still further shaving cutter known on which the grooves are arranged in a similar manner whose walls make an angle with the tip surfaces which are only greater than 90° (U.S. Pat. Nos. 2,291,537, 2,356,868).

Up to now, it has been necessary to bear in mind in the construction of shaving cutters that the tool not only cuts on the tooth flank but also at its tip. In other words, the shaving cutter cuts not only because of its lengthwise stroking but also because the tool tip penetrates into the teeth being formed on the workpiece. By this penetrating or cutting, the lengthwise edge or edges constitutes the cutting edges and the tip surface constitutes the tool face. In known shaving cutters, there is naturally provided a strong negative chip angle. For those cutting edges which are formed by the groove wall and the tip surface, the tip surface provides a relief face with the relief angle of approximately 0°. These features can singly or together disturb the shaving procedure and thus lead to an insufficient shaving operation.

The purpose of the invention is to keep in mind in the design of a shaving cutter the creation of chips at the tooth tip in order to render unharmful the disturbances which develop through large or unsymmetrical shaving forces at the tip edge or at least to minimize same. The invention concerns itself accordingly with shaving cutters which are formed from one piece as well as with tools which are assembled from lamellae or disks.

The invention accordingly solves at least the following basic problems:

1. That the outer surfaces of the tool teeth constituting the tooth tips (tip surfaces) are angularly arranged at least at one cutting edge on a cord or a tangent to the surface of the cylinder defined by the tooth tips. The cutting edges to which the invention relates can be formed either by the top lands and the tooth flanks or by the top lands and the groove walls. In the present invention, both cutting edges are considered the same. The invention has also the advantage that the shaving forces which exist in addition to the precise amount required for a shaving stroke and therefore are considered undesirable in a calculation and are accordingly withdrawn from consideration by use of a compensating factor are so diminished that they no longer need to be considered.

2. It is especially important for a precision cut that the shaving cutter head is of such a construction, according to the invention, that there is provided at the part of the tip surfaces providing the lengthwise edge of said tip an angle with respect to a cord or tangent to the surface of the outside cylinder of the tool. The principal cutting is brought about by the penetration of the cutting head into the body of the workpiece and this has been brought about up to now with a strongly negative chip angle. According to the invention, the chip angle is adjusted to the workpiece and the tool material whereby the shaving forces are minimized.

3. The tooth head cuts not only by reason of penetration or cutting but also by reason of the lengthwise movement resulting from the crossing of the axes (when such is provided). Then cutting is obtained from the edge which is formed by the tip edge and the groove wall. The groove wall is in such case the tool face and the tip surface is the relief face. In previously known shaving tools, it has up to now not been noticed that it can be detrimental for the tooth tip to be lacking a relief angle. For the correction of this point it is proposed by the invention that the parts of the tip surfaces constituting the walls of the grooves make an angle with the plane extending through the cord or tangent of the outside cylinder of the tool.

4. From the foregoing discussion, it is apparent that it will be advantageous to provide at the tooth tip both a particular angle at the edge extending along the tip and also a particular relief angle to the groove wall. A shaving wheel according to the invention can accordingly be advantageously so constructed that the parts of the tip surfaces including both the edges extending along the tips and also the groove walls are sloped with respect to a plane lying in the tangent or the cord of the outside cylinder of the tool.

5. For the cutting of the lengthwise edges of the tooth tips, a chip angle is advantageously provided which is either positive or negative. A shaving tool according to the invention can accordingly be so constructed that it defines substantially a right angle (chip angle equals 0°) between the part of the tip surface including the lengthwise edges of the tips and the tangential plane lying on the tooth flank at the tooth tip.

6. On the other hand, a positive chip angle (acute edge angle) has in practice proved advantageous. The shaving tool according to the invention accordingly includes the feature that the part of the tip surfaces including the lengthwise edges of the tips provides an acute angle (positive chip angle) with respect to the tangential plane on the side of the workpiece lying on the tooth flank of the tooth tip.

7. The invention is of particular importance for so-called plunge shaving, namely, in a shaving method in which the shaving tool is operated only by changing the axis spacing relative to the workpiece. In this method, the direction of cutting movement (rotational direction) constitutes a particular problem which up to now has not been solved. In other words, up to now it has not been successful to operate on a workpiece by plunging methods but only by rotation of the shaving tool. The invention takes notice that an important feature lies in the dissimilar forces developed in addition to the particular cutting force itself on the entering side of the workpiece and on the exit side thereof. If the shaving tool, however, is made according to the invention so that these angles are provided only on one tooth side (left or right), then this difficulty can be obviated. The invention has accordingly a special and obvious importance in connection with plunge shaving.

8. For plunge shaving, the invention is especially advantageous if different angles are provided at the two sides of the tooth (left or right) because then the division of the forces can be accommodated to the circumstances of a given shaving operation with only a single direction of rotation.

9. Up to now, it has always been believed that the chip angle at the lengthwise edge of the tip will be naturally either positive or at least only slightly negative. It is of accordingly importance in the invention that a chip angle is created which is still more negative than the natural angle existing between the tooth flank and the outside cylinder or other tip or body envelope. In this manner then the chip force upon entry of the shaving tool tip into engagement knowingly increases. Through this "exaggerated negative" chip angle there is provided a so-called tip chamfer which as such is known but has never been used for the purpose of the invention. A chamfer along the lengthwise edge of the tooth tip is also included within the scope of the claims as a solution to the main problem dealt with by the invention.

The "exaggerated negative" tip angle is of especial importance for plunge shaving in which, as already set forth, the use of a predetermined rotational direction is desired. The forces required for plunge shaving can under some circumstances be controlled particularly well if the shaving tool has different chip angles at its two sides. Thus, for example, it is desirably so constructed that there is provided on one side a positive chip angle and on the other side a negative chip angle or a "exaggerated negative" chip angle. The relief angle at the tip of the tooth can also be dealt with in a somewhat corresponding manner.

Further features of the invention will be apparent from the description and the drawings.

A special advantage of the invention is in prolonging the working life of the shaving tool. In the shaving of gear wheels of high quality, it is necessary upon engagement of the gear and the shaving tool that existing disturbances either become suppressed or that the shaving wheel becomes so controlled that the known disturbances mutually cancel themselves (DBP 970 027, U.S. Pat. No. 3,180,227). For this purpose, the addendum modification and the outer diameter are adjusted to each other. Since the addendum modification tends to become negative upon sharpening of the tool, the above-described pattern has a limit because the addendum modification can no longer be proportioned according to DBP 970 027 or U.S. Pat. No. 3,180,227. Through the grinding of the tooth tips according to the invention, a division of forces in the advancement of the cutter can be developed which further renders possible the handling of these difficulties.

The invention is illustrated in FIGS. 1–7.

FIG. 1 shows schematically the cooperation between one shaving cutter with the flank of a workpiece.

FIG. 2 shows an example of a shaver tooth according to the invention.

FIG. 3 shows schematically a further modification.

FIG. 4 shows a still further modification.

FIG. 5 shows in plan view a part of a shaver tooth with a cutting groove to which a further development of the invention is applied.

FIG. 6 shows a view of the tooth flank of the part of the tooth illustrated in FIG. 5.

FIG. 7 is a view of the face surface of the tooth according to the invention which is partially shown in FIG. 5.

FIG. 1 shows schematically the cooperation of a shaving tooth 1 with a workpiece tooth 2 during one phase of the shaving stroke. The method of gear shaving, the machine, and in principle the tool, are all known (see, for example, the above description of the prior art), so that it is not necessary to describe these further.

While the shaver tooth 1 effects the shaving operation within the space 3 between the pair of workpiece teeth, the lengthwise edge of the tool tip (extending along the entire length of the tooth without regard to the interruptions by the cutting grooves) shaves a chip 5 whose thickness corresponds somewhat to the shaving gap 6, said term shaving gap referring to the difference between the shaved flank 7 and the unshaved flank 8. For further reference, the shaver flank 9 determines the relief face and the tip surface comprises the tool face. In known shavers, the tip surface 10 coincides with the outside cylinder of the tool, namely, the imaginary cylinder defined by the tips of the shaver teeth. The edge angle is the angle 12 which is enclosed by the main surfaces 9 and 10. This is relatively large in the known shavers. The rake angle is defined by the tip surface (for example, 10) and the line 13 drawn perpendicularly to the cutting edge 4 on the tool flank 9. If the rake angle deviates from line 13 in the direction of an obtuse angle 12, then there is developed a negative rake angle 14; if it deviates in the direction of an acute angle 16, then there is developed a positive rake angle 15. If the rake angle becomes exaggerated positively with respect to the tip surface, then there develops an "exaggerated positive" rake angle 17 which can be utilized to increase, for example, the chip force or pressure by reason of equal loading on the tooth.

FIG. 2 shows a further example of the invention in connection with a shaver tooth 20. The flanks of these teeth are provided in a known manner with a number of grooves 21 and lands 22 lying therebetween. The tooth flank 23 and the groove walls 24 together in a known manner provide cutting edges on the flanks. Flank 23, particularly the flank of the land 22 and the tip surface 25, provides the cutting edges 26 in a similar manner on the lengthwise edges of the tips. The tip surfaces 25 are so sloped with respect to the cord 27 of outside cylinder surrounding the tooth tips (in this case the outside cylinder 11) that there is developed a positive rake angle. (When in the above a single numeral is utilized in reference to the lengthwise tip edge, it is intended thereby to refer to all lands occurring along such edge). The tip faces 25' lying along the oppositely positioned flanks provide similar positive rake angles.

FIG. 3 shows a part of a shaver tooth as an example of a positive rake angle 15 which is arranged on only one side of the tooth.

FIG. 4 shows an example in which there is provided a positive rake angle 41 on one side of the tooth and an "exaggerated negative" rake angle 42 on the other side thereof.

So far reference has been made only to the cutting edge formed by the tip surface of the tooth and the tooth flank. There exists, however, also a further cutting edge where the surface 51 of a tooth intersects the walls 52, 52' of the cutting groove 53 or the face surface 54. For the working of the increment 6 (FIG. 1) there is illustrated in this section a groove wall 52, 52' as the tool face and the tip surface 51 as the relief surface. In this manner it is provided that the part of the top surface which connects to the groove walls or to the face surfaces is ground at an angle to the unmodified top surface and this develops behind the cut a relief angle 56 in the nature of an acute angle 55. In the embodiment of FIGS. 5 to 7 there is also shown at the lengthwise tip edge a rake angle 57 according to the invention. The relief angle and the rake angle are naturally required along only the length which corresponds approximately to an extra accuracy of the shaving gap 6, in view of the grinding on the tooth flank when same is sharpened. Upon consideration of this viewpoint, reference is made by way of example to the triangular surface 58 which is sloped from the cutting edge rearwardly. This triangular surface provides at the tooth flank the tool face and at the groove wall the relief face. FIGS. 5–7 are set forth only schematically. It is obvious how the surfaces 58 are made. The form of FIG. 5 can probably be manufactured only by electrochemical methods. The surfaces, however, can also be ground in the same general manner as the tips of FIGS. 2–4 are formed by grinding, excepting that the forms of FIGS. 5–7 of the tooth tips contain many deep slots.

Although a particular preferred embodiment of the invention has been disclosed above for illustrative purposes, it will be understood that variations or modifications thereof which lie within the scope of the appended claims are fully contemplated.

The embodiments of the invention in which an exclusive property or privilege is claimed are defined as follows:

1. A gearlike tool for the precision and chip removal working of gears, for example, a gear shaving tool, comprising tooth flanks having a plurality of grooves and lands defining cutting edges therebetween, the outer surface of each tool tooth defining a tooth tip being arranged angularly at least at one cutting edge to the chord or tangent to an imaginary surface surrounding the tool at the tooth tips.

2. Tool according to claim 1, wherein said outer surface of said tooth tip adjacent the lengthwise tip edges form an angle to said chord or tangent to said imaginary surface surrounding the tool teeth.

3. Tool according to claim 1, wherein said outer surface of said outer tooth tip adjacent the edges which are defined by the walls of the grooves and the tooth tip surfaces to form an angle to said chord or tangent to said imaginary surface surrounding the tool teeth.

4. Tool according to claim 1, wherein said outer surface of said tooth tip adjacent the edges which are defined by the sides of the tooth and the tooth tip surface form an angle to said chord or tangent to said imaginary surface surrounding the tool teeth.

5. Tool according to claim 1, wherein said outer surface of said tooth tip adjacent the lengthwise tip edges and the edges defined by the walls of the grooves form an angle to said chord or tangent to said imaginary surface surrounding the tool teeth.

6. Tool according to claim 1, wherein said outer surface of said tooth tip adjacent the lengthwise tip edges and the edges defined by the sides of the tooth form an angle to said chord or tangent to said imaginary surface surrounding the tool teeth.

7. Tool according to claim 1, wherein said outer surface of said tooth tip adjacent one lengthwise tip edge forms a right angle (rake angle equaling 0°) with a plane extending tangentially to the tooth flank and through said lengthwise tip edge.

8. Tool according to claim 1, wherein said outer surface of said tooth tip adjacent one lengthwise tip edge forms an acute angle (positive rake angle) with a plane extending tangentially to the tooth flank and through said lengthwise tip edge.

9. Tool according to claim 1, wherein the angle between said outer surface and said chord or tangent to the imaginary surface is only provided on one side of a tooth (left or right).

10. Tool according to claim 1, wherein different angles between said outer surface and said chord or tangent to the imaginary surface are respectively provided on the two sides (left or right) of a tooth.

* * * * *